United States Patent
Arkan et al.

(10) Patent No.: US 10,780,875 B2
(45) Date of Patent: Sep. 22, 2020

(54) SPRING BRAKE CHAMBER

(71) Applicant: ARFESAN ARKAN FREN ELEMANLARI SANAYI VE TICARET ANONIM SIRKETI, Kocaeli (TR)

(72) Inventors: Fuat Burtan Arkan, Kocaeli (TR); Remzi Sahinoglu, Kocaeli (TR); Omer Faruk Kulac, Kocaeli (TR)

(73) Assignee: ARFESAN ARKAN FREN ELEMANLARI SANAYI VE TICARET ANONIM SIRKETI, Kocaeli (TR)

( * ) Notice: Subject to any disclaimer, the term of this patent is extended or adjusted under 35 U.S.C. 154(b) by 234 days.

(21) Appl. No.: 16/098,882

(22) PCT Filed: Dec. 19, 2016

(86) PCT No.: PCT/TR2016/050513
§ 371 (c)(1),
(2) Date: Nov. 5, 2018

(87) PCT Pub. No.: WO2017/119860
PCT Pub. Date: Jul. 13, 2017

(65) Prior Publication Data
US 2019/0193709 A1    Jun. 27, 2019

(30) Foreign Application Priority Data
Jan. 6, 2016    (TR) .................................. 2016/00139

(51) Int. Cl.
*B60T 17/22* (2006.01)
*B60T 17/08* (2006.01)
(Continued)

(52) U.S. Cl.
CPC .......... *B60T 17/221* (2013.01); *B60T 13/261* (2013.01); *B60T 13/38* (2013.01); *B60T 17/083* (2013.01)

(58) Field of Classification Search
CPC .... B60T 17/083; B60T 17/085; B60T 17/086; B60T 17/081; B60T 17/08; B60T 17/221;
(Continued)

(56) References Cited

U.S. PATENT DOCUMENTS 3,593,265 A * 7/1971 Howard .................. B60T 17/22
340/452
3,651,457 A * 3/1972 Sprouse .................. B60T 17/22
340/457.3
(Continued)

FOREIGN PATENT DOCUMENTS

CA         2277976 C    1/2001
CN       203047246 U    7/2013
(Continued)

*Primary Examiner* — Bradley T King
*Assistant Examiner* — Stephen M Bowes
(74) *Attorney, Agent, or Firm* — Bayramoglu Law Offices LLC

(57) ABSTRACT

A spring brake chamber for pneumatic braking systems used in heavy commercial vehicles such as buses, trucks, trailers and tractors, includes a power spring configured to detect the parking position, the driving position and the situation in which the power spring is broken. The present invention allows the driver to be notified by sending a signal.

2 Claims, 4 Drawing Sheets

(51) Int. Cl.
*B60T 13/26* (2006.01)
*B60T 13/38* (2006.01)

(58) Field of Classification Search
CPC ........ B60T 17/22; B60T 13/38; B60T 13/385;
B60T 8/88; F16F 2125/02; F16F 2125/12;
F16D 2121/08; F16D 2121/10; F16D 2121/12
See application file for complete search history.

(56) References Cited

U.S. PATENT DOCUMENTS

| | | | | |
|---|---|---|---|---|
| 3,736,842 A | * | 6/1973 | Valentine | B60T 13/261 91/1 |
| 3,800,668 A | * | 4/1974 | Valentine | B60T 17/083 91/399 |
| 5,572,187 A | | 11/1996 | Williford | |
| 2015/0094906 A1 | * | 4/2015 | Greene | B60T 13/263 701/33.9 |
| 2017/0113672 A1 | * | 4/2017 | Gaufin | B60T 17/221 |

FOREIGN PATENT DOCUMENTS

| | | |
|---|---|---|
| DE | 102011118519 A1 | 5/2013 |
| FR | 1492657 A | 8/1967 |

\* cited by examiner

SPRING BRAKE CHAMBER

CROSS REFERENCE TO RELATED APPLICATIONS

This application is the national phase entry of International Application PCT/TR2016/050513, filed on Dec. 19, 2016 which is based upon and claims priority to Turkish Patent Application No. 2016/00139, filed on Jan. 6, 2016 the entire contents of which are incorporated herein by reference.

TECHNICAL FIELD

The invention subject to the application comprises a spring brake that is used in pneumatic braking systems used in heavy commercial vehicles such as buses, trucks, trailers and tractors, and spring brake which includes power spring, detects the parking position, the driving position and the situation in which the power spring is broken and allows the driver to be notified by sending a signal.

BACKGROUND

The invention subject to the application comprises a spring brake that is used in pneumatic braking systems used in heavy commercial vehicles such as buses, trucks, trailers and tractors, and spring brake which includes power spring, detects the parking position, the driving position and the situation in which the power spring is broken and allows the driver to be notified by sending a signal.

The brake chambers that are used in the pneumatic brake systems present in heavy commercial vehicles are divided into two categories as service brake chambers and spring brakes. Spring brakes comprise a service housing that acts similar to the service brake chambers in which service braking is performed and a spring housing in which the spring braking is performed. Said service housing operates when it is desired to slow or stop the vehicle. If it is desired to slow or stop the vehicle while the vehicle is moving, a force is applied onto the foot brake pedal. The pressurized air from the compressor fills the spring brake between the diaphragm and the cover with air. The diaphragm that turns by the effect of the air pushes the shaft forward and enables transmitting the braking force to the wheels of the vehicle. When it is desired to immobilize the vehicle or when there is an air leak for any reason in the system, the spring housing of the spring brake that contains a power spring operates. In this case, the vehicle is immobilized by the forward motion of the shaft due to power spring into the spring chamber. In other words, while the service housing of the spring brakes operates when a force is applied on the foot brake pedal in case it is desired to slow down or stop the vehicle as in the service brake chambers; the spring housing operates when a force is applied to the hand (parking) brake.

Brake chambers are braking components that are subjected to the corrosive effects of the outdoor environment. Therefore, there is a possibility for the power spring manufactured from steel to be broken. In the case that the power spring is broken while the vehicle is moving, the vehicle can never provide the parking position and this situation makes it harder to leave the vehicle in a parked position particularly on inclined roads. The length of an average power spring is 150 cm; said fractures may occur at various points on the spring. When it is broken at the ends, the spring can perform its emergency spring function mechanically. However, since its force is decreased, it cannot provide the desired braking force for the vehicle. Besides; the broken parts of the spring or the parts that enter into the chamber from the outside prevents the spring housing of the chamber from being completely set up. When it is desired to take the spring brake out from parking position, if it is not completely set up, the vehicle may act as if it is still braking. This situation may cause overheating of the brake linings and thus burning of the wheels and finally burning of the vehicle. Moreover, there is a possibility for the broken spring parts to damage the diaphragm in the chamber, and there is a possibility for the springs to prevent the chamber from being set up by entering between the coils of the power spring. Therefore, it is a very important and necessary situation to inform the driver when the power spring is broken.

In the known state of the art, to accomplish this, a sensor located on the parking brake handle of the service brake chambers used on heavy commercial vehicles such as busses, trucks, trailer trucks and trailers is used. The invention subject matter of the application provides a solution that can be implemented in all the vehicles that use pneumatic braking systems by easily integrating the related components into a standard pneumatic braking chamber. By checking if an aluminium flange mounted on the lower housing of the spring brake contacts a conductive disk and through a microcontroller, it is detected if the spring is completely set up or if it is broken, the integrity of the spring is tested and a warning signal is sent to the driver. Thus, it is prevented for the parts that have been broken when the power spring is fractured, from entering into the coils and damaging said coils of the power spring or the damaging of the linings and wheels of the vehicle due to not completely setting up by the spring when the power spring is broken is prevented.

SUMMARY

The invention subject to the matter of application comprises a spring brake that is used in pneumatic braking systems used in heavy commercial vehicles such as buses, trucks, trailers and tractors, and spring brake which includes power spring, detects the parking position, the driving position and the situation in which the power spring is broken and allows the driver to be notified by sending a signal.

The spring brake of the invention basically comprises a lower housing in which the park braking is performed, an power spring, an electric circuit that contains an aluminium flange, a microcontroller connected to the positive and negative terminals of this circuit, a diaphragm, connection plate, an upper housing in which the service braking is performed, a shaft located inside said upper housing which enables braking through its forward motion and a return spring that enables backward movement of said shaft. Signals are obtained via contact of said flange to a conductive disk and these signals are compared to pre-defined signals by the microcontroller. Depending on the differences emerging on the signal levels, a warning is sent to the driver.

Thanks to the spring brake formed by combining the mechanical parts of the invention together, the present invention has the following advantages.

The driver is informed when the power spring is broken.
It is prevented for parts of a broken power spring to damage other parts, particularly linings and wheels, of the spring brake.
It is ensured that the driver is informed if the power spring is completely set up or not.

It can be used in all the vehicles where the pneumatic brake systems are used.

BRIEF DESCRIPTION OF THE DRAWINGS

The figures prepared to better describe the spring brake that enables detection of the parking position and driving position of the power spring and the situation when the power spring is broken which comprises an power spring and enables sending a warning signal to the driver in the spring brakes that are used in the pneumatic braking systems present in heavy commercial vehicles such as busses, trucks, tractors and trailers are described below.

The parts/components/items in the figures prepared to better describe the spring brake developed by the invention are individually assigned reference numbers and these numbers refer to the following;

1. Connection Plate
2. Diaphragm
3. Aluminium flange
4. Lower housing
5. Power spring
6. Jack
7. Positive Terminal
8. Negative Terminal
9. Dielectric Disk
10. Conductive Disk
11. Spring Chamber
12. Parking Chamber
13. Shaft
14. Spring Brake
R: Resistance
CPU: Microcontroller

DETAILED DESCRIPTION OF THE EMBODIMENTS

Figure 4:
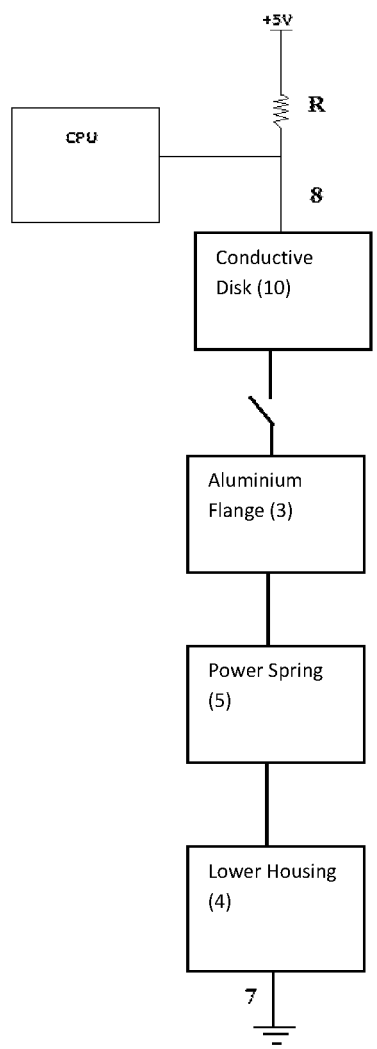
FIG. 4 shows a schematic view of the electronic circuit present in the spring brake.

In the invention subject matter of the application, an spring brake (14) that enables detection of the parking position and driving position of the power spring and the situation when the power spring is broken, which comprises an power spring (5) and enables sending a warning signal to the driver in the spring brakes that are used in the pneumatic braking systems present in heavy commercial vehicles such as busses, trucks, tractors and trailers is described. This spring brake (14) comprises a connection plate (1), a lower housing (4) containing a spring chamber (11) in which there is an power spring (5), a diaphragm (2) provided by compressing in the connection region of the connection plate (1) and the lower housing (4), a shaft (13) that performs the braking through its forward movement, an parking chamber (12) into which air from the compressor enters in when force is applied to the foot brake pedal; and particularly has an electronic circuit that contains a microcontroller (CPU) that detects the parking position and driving position of the power spring and the situation if the power spring is broken and sends a signal to the driver. Said microcontroller (CPU) transmits two separate signals to the driver that is the contact signal when the power spring (5) is completely set up and the warning signal when a problem occurs such as a fracture in the power spring (5) etc. The schematic diagram of the electronic circuit provided in the spring brake (14) of the invention is shown in FIG. 4. This circuit consists of a lower housing (4), an power spring (5), an aluminium flange (3), conductive disk (10), a jack (6) to which the positive terminal (7) and the negative terminal (8) of the cable connected to the microcontroller (CPU) are connected to. Additionally, a dielectric disk (9) is located between the lower housing (4) and the conductive disk (10) to ensure isolation between the lower housing (4) and the conductive disk (10) which is an electronic circuit component. This isolation is very important for operation of the circuit and it is possible for the circuit to be prevented from being operated if the isolation is not properly established.

The length of the power spring (5) used in the spring brakes (14) is constant and the same material is used everywhere. Thus, it has a constant resistance (R). Since the resistance (R) on the power spring (5) is constant, a constant voltage is created when a current is passed through this power spring (5). The constant voltage value determined depending on the resistance (R) of this power spring (5) is initially defined in the memory of the microcontroller (CPU). When a fracture occurs in the power spring (5), the known constant value of the resistance (R) will drop and the value of the voltage created when a current is passed will also change depending on the changed resistance (R). The microcontroller (CPU) of this invention enables sending a signal to the driver by detecting said voltage difference.

The detection step of the parking position and driving position of the power spring and the step of sending contact and warning signal to the driver are as described below;

Air from the compressor fills into the parking chamber (12) when force is applied to the foot brake pedal.

The air filled into the parking chamber (12) enables reverse movement of the diaphragm (2) towards the lower housing (4).

The backward moving diaphragm (2) pushes the aluminium (Al) flange (3) provided under it and the power spring (5) in the spring chamber (11) starts to compress.

This movement of the aluminium flange (3) continues until it contacts the conductive disk (10) provided on the base of the lower housing (4).

In case of breaking and fracture of the power spring (5) such that the aluminium flange (3) does not contact the conductive disk (10), the microcontroller (CPU) cannot read any voltage since no current passes through the positive terminal (7) and the negative terminal (8) and sends a warning signal to the driver informing that the power spring (5) has been fractured.

Figure 1:
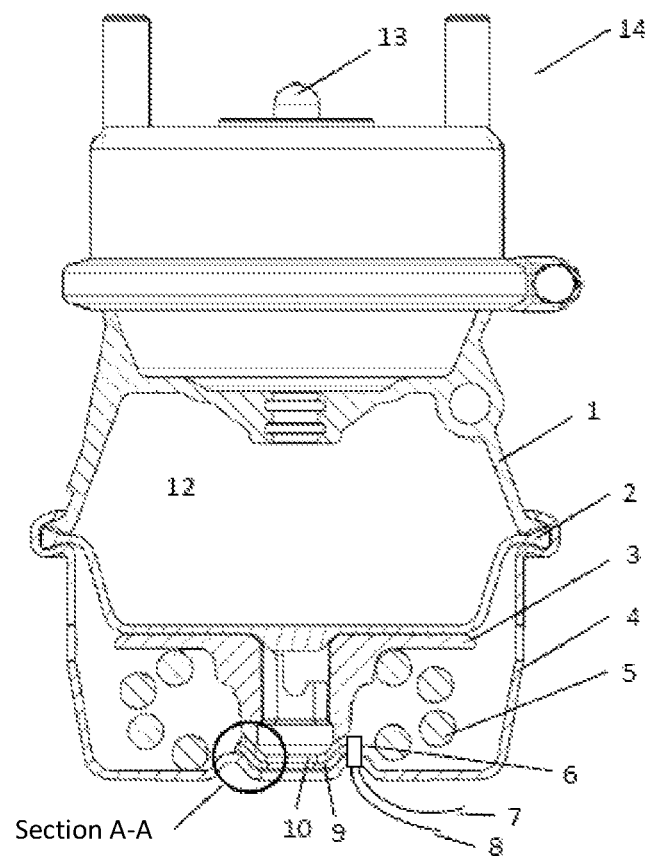
FIG. 1 shows a spring brake during driving.
Figure 2:
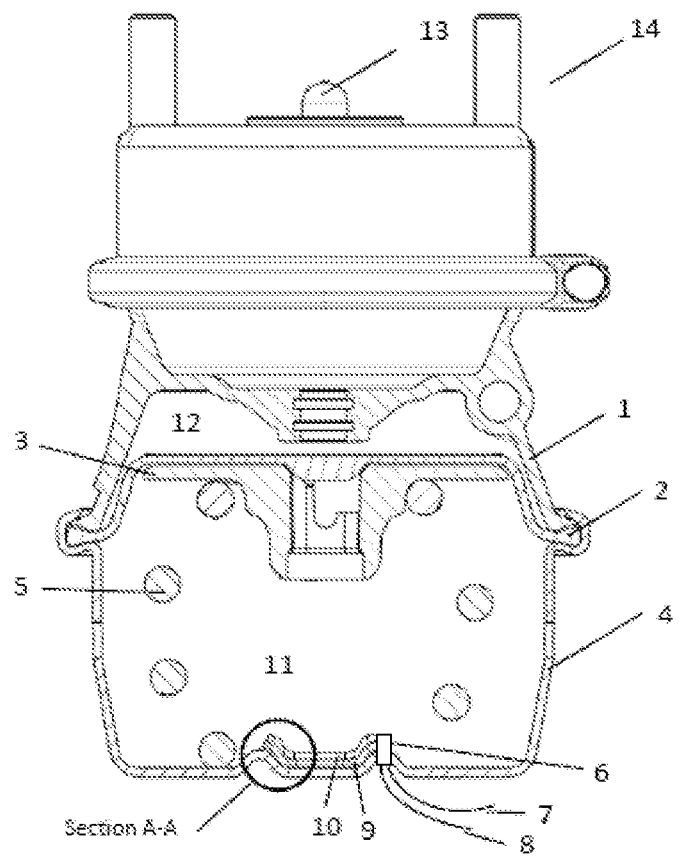
FIG. 2 shows a spring brake in parking condition.
Figure 3:
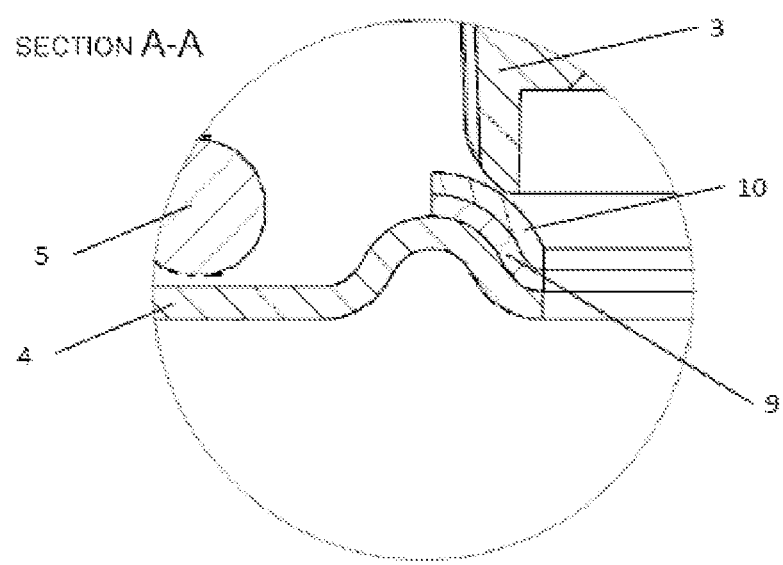
FIG. 3 shows a cross-section detail view of the aluminium flange when in contact with the conductive disk.

When the aluminium flange (3) contacts the conductive disk (10) on which current passes, the current received from the positive terminal (7) of the cable connected to the jack (6) provided on the lower housing (4) respectively passes through the lower housing (4), power spring (5), aluminium flange (3) and conductive disk (10) and completes a circuit by exiting from the negative terminal (8) of the cable. (Shown in FIG. 1)

The microcontroller (CPU) compares the voltage value from the positive terminal (7) and the negative terminal (8) and compares the difference with the value initially defined in its memory according to the resistance (R) of the power spring (5).

When there is no difference between the compared values, the microcontroller (CPU) transmits a contact signal informing the driver that the power spring (5) is completely compressed and the spring brake (14) is completely set up and the vehicle is in normal driving condition.

When there is a difference in the compared values, the microcontroller (CPU) transmits a warning signal informing the driver that there is a fracture in the power spring (5) or the spring brake (14) cannot be completely set up due to a problem.

What is claimed is:

1. A spring brake for a pneumatic braking system used in a heavy commercial vehicle, the spring brake comprising:
a power spring, wherein a microcontroller detects a parking position and a driving position of the power spring and in a situation in which the power spring is broken, the microcontroller allows a driver to be notified with the situation by sending a signal;
a connection plate;
a lower housing; wherein the lower housing contains a spring chamber, the power spring with a constant resistance is arranged in the spring chamber, a diaphragm is provided at a connection region of the connection plate and the lower housing by being compressed;
a shaft, wherein the shaft performs braking via a forward motion of the shaft;
a parking chamber, wherein air from a compressor enters the parking chamber when a force is applied to a foot brake pedal;
the spring brake further comprises an aluminium flange, a conductive disk, a jack, and an electronic circuit, wherein the electronic circuit comprises the microcontroller, a positive terminal and a negative terminal of a cable from the jack is connected to the microcontroller, the microcontroller sends two separate signals to the driver, wherein the two separate signals comprise a contact signal sent when the power spring is completely set up and a warning signal sent when a problem occurs; and
the spring brake further comprises a dielectric disk located between the lower housing and the conductive disk to provide an isolation between the lower housing and the conductive disk.

2. A process of detecting a parking position and a driving position of a power spring, detecting a situation where the power spring is broken, and sending a contact signal and a warning signal to a driver, the process comprising:
applying a force to a foot brake pedal, wherein along with air from a compressor filling into a parking chamber, a diaphragm moves backward towards a lower housing; pushing, by the diaphragm, an aluminium flange provided beneath the diaphragm, wherein a movement of the aluminium flange compresses the power spring in a spring chamber until the aluminium flange contacts a conductive disk through which a current passes;
sending the warning signal to the driver to inform the driver that the power spring has been fractured when the power spring is broken or fractured such that the aluminium flange no longer contacts the conductive disk, the microcontroller cannot read any voltage since no current passes through the positive terminal and the negative terminal;
wherein, when the aluminium flange contacts the conductive disk, the current received from a positive terminal of a cable connected to a jack provided on a lower housing respectively passes through the lower housing, the power spring, the aluminium flange and the conductive disk and completes a circuit by exiting from a negative terminal of the cable;
comparing, by a microcontroller, voltage values from the positive terminal and the negative terminal and comparing, by the microcontroller, a difference with a value initially defined in a memory according to a constant resistance of the power spring;
wherein, when there is no difference between the compared values, the microcontroller transmits the contact signal informing the driver that the power spring is completely compressed, a spring brake is completely set up, and a vehicle is in a normal driving condition, when there is a difference between the compared values, the microcontroller transmits the warning signal informing the driver that there is a fracture in the power spring or the spring brake cannot be completely set up due to a problem.

* * * * *